United States Patent [19]

Korstvedt

[11] 3,759,218

[45] Sept. 18, 1973

[54] BREADING APPARATUS
[76] Inventor: Harald O. Korstvedt, 116 Winthrop Rd., Brookline, Mass. 02146
[22] Filed: Aug. 3, 1971
[21] Appl. No.: 168,698

[52] U.S. Cl.................. 118/18, 118/21, 118/22, 118/24, 118/312
[51] Int. Cl............................................. A21c 9/04
[58] Field of Search .................. 118/24, 18, 16, 22, 118/312, 603, 610, 20, 21; 209/348

[56] References Cited
UNITED STATES PATENTS

| 250,156 | 11/1881 | McKellar | 209/348 X |
|---|---|---|---|
| 991,919 | 5/1911 | Werner | 118/24 |
| 1,801,572 | 4/1931 | Salerno | 118/24 X |
| 2,770,212 | 11/1956 | Marantz | 118/610 X |
| 2,855,893 | 10/1958 | Greer et al. | 118/24 X |
| 3,045,640 | 7/1962 | Hill et al. | 118/24 X |

Primary Examiner—John P. McIntosh
Attorney—Morse, Altman & Oates

[57] ABSTRACT

An apparatus for applying comminuted material such as breading to a food product whereby an abundance of comminuted breading is applied to a moistened food product until thoroughly covered, whereupon the excess loose breading and any resulting lump particles of moisture and breading and/or undesirable particles of food product are removed and immediately sifted to separate said excess loose breading from said lump particles to prevent contamination of said excess loose breading by extended association with said particles on conveyor or other transporting means. A vibrating sifter device is utilized to effect separation of the excess loose breading from the lump particles immediately following the breading operation before transporting said mixture via belts or other transporting means.

4 Claims, 3 Drawing Figures

INVENTOR
HARALD O. KORSTVEDT

BREADING APPARATUS

BACKGROUND OF INVENTION

Presently utilized apparatus for breading food products receives the food product in a moistened condition as having been dipped in oil, water, batter or other moisturizing agent. The food product is then placed on a bed or layer of comminuted breading material, riding on the webbing of a wire mesh conveyor belt, to be breaded on the bottom thereof. Additional comminuted breading material is spread on the top and surrounding sides from a separate source usually a hopper bin with a gravity assisted flow. While completely encased in breading material the food product is slidably moved along with the webbed conveyor belt supported on a stationary tray means to maintain the breading surrounding the product while being subject to slight pressure from a roller means to assist the adherence of the breading to the food product. As the breading and food product moving on the conveyor belt pass off the end of the tray means, the excess breading falls away from the food product through the webbing of the conveyor belt and the food product is carried on to a separate delivery means such as another conveyor belt. Alternatively, the breading operation may be performed as above except on a solid flexible conveyor belt, such as neoprene, and then breading and food product are transferred to a separate mesh belt to effect the separation of excess breading from food product as described. The excess breading at this stage usually includes a number of lumps in the mixture formed from the moisture in the food product as well as occasional dislodged particles of food product. The excess breading and lumps which fall through the webbing of conveyor belt are usually moved down a delivery chute and then a separate return conveyor to a separate location and then the breading is returned to the hopper bin or the belt for recycling depending on the type of apparatus utilized. In some cases the apparatus may include a sifter device to remove the aforesaid lumps after the excess breading has travelled through the chute and the return conveyor belt prior to return to the hopper bin. These breading lumps, formed by the excess moisture or batter from the food product, should be removed before the breading is recycled through the machine, as they tend to increase in size as they are moved along conveyor belts and undesirably clog moving parts of the apparatus. These lumps and food particles, if allowed to circulate through the machine throughout the operating day, foster bacterial growth and may cause bacterial contamination of an unacceptable level. Standard practice in many processing plans is to recondition the breading by sifting, or even totally dispose of the breading load at approximately four hour intervals, depending on the nature of the food product and the current requirements of the particular government regulatory agency involved. These lumps also may lodge in inaccessible locations which result in unsanitary conditions. It is a prime requisite in this breading process to keep at a minimum any contact of the breading lumps with any surface, before recycling. The breading lumps being moist will tend to stick to or coat any surface they touch and therefore contact of the breading lumps with chutes and conveyor belts prior to sifting should be kept to a minimum.

SUMMARY OF INVENTION

According to the present invention there is provided a new and novel breading apparatus whereby a moistened food product is placed on a layer of comminuted breading on the webbing of a moving wire mesh conveyor belt, covered completely with additional comminuted breading, compressed lightly and then immediately stripped of excess breading and breading lumps formed thereabout and passed on to a delivery means. The removal of breading lumps and food particles is done immediately following the breading of the food product by having the food product move on the wire mesh conveyor belt over a stationary tray means while the breading is being accomplished. As the wire mesh moves off the end of the tray means, the wire mesh belt is subject to vigorous vibrating by a shaker shaft while simultaneously being subject to pressurized air streams to cause all excess breading and breading lumps to fall through the wire mesh directly onto a sifter device without contacting any guiding or conveying means. The excess breading and bread lumps are sifted by the sifter which is moving in a vibrating motion by cam means in a manner that all bread lumps and local concentrations of moistened breading are immediately moved down an incline surface of said sifter to a removal location and the reusable comminuted breading passes directly through the sifter to return means without contacting any surfaces which might become contaminated with moisture from the breading lumps.

Other provisions of this new and novel breading and sifting apparatus will become more apparent when taken in conjunction with the following detailed description and the accompanying drawings wherein.

DESCRIPTION

Figure 1:
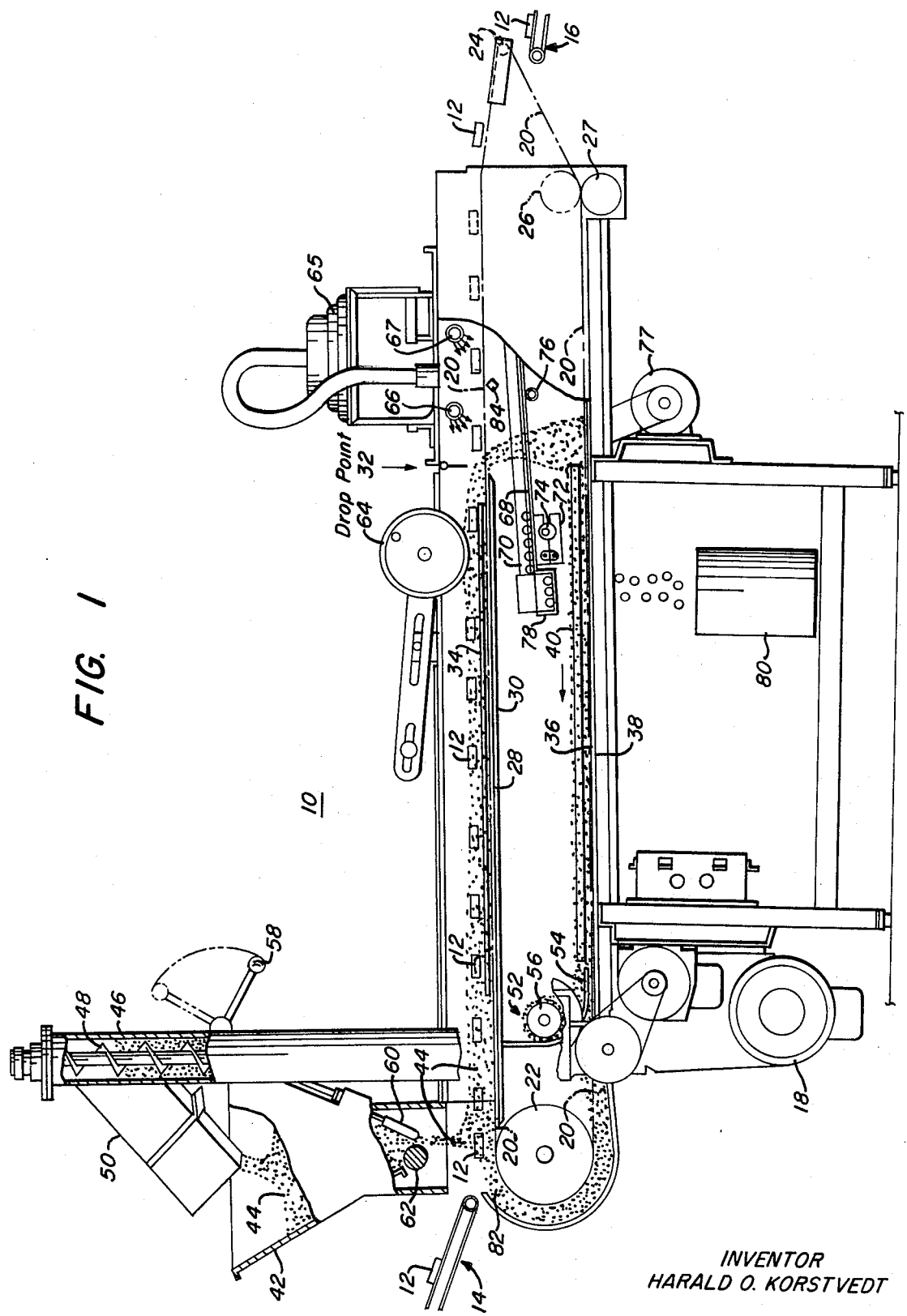
FIG. 1 is a side elevational view of the breading machine of this invention with a cut-away portion to show the novel sifter arrangement.

Referring to FIG. 1 there is shown a breading machine 10 wherein a moistened food product 12 shown herein as rectangular shapes are fed from an outside supply conveyor belt 14 of a separate processing machine (not shown) to the present breading machine 10 and after passing therethrough in a manner described hereinafter are delivered to a delivery conveyor belt 16 of a separate processing machine (not shown).

The breading machine 10 shown herein is of relatively standard construction having the usual supporting frame members and belt driving motors which are not essential to an understanding of the present invention and are therefore not described in detail herein. Only the elements essential to the actual breading and sifting are described in detail herein.

A drive motor 18 is provided with suitable driving pulleys for driving an endless wire mesh conveyor belt 20 in a horizontal path about drive rollers 22, 26 and 27 and adjustable tension nose roller 24 in a clockwise rotation manner such that food products on the upper traverse 28 of the belt 20 moves in a direction of left to right as viewed in FIG. 1.

It is to be noted, that the single belt configuration including the rollers 24, 26 and 27 as shown herein, is not conventional and not part of the present invention, but is utilized for simplicity of description. The shown belt configuration is part of a separate invention, an application for which will be prepared at a subsequent date.

The upper traverse 28 of the belt 20 is guided on the underside thereof by a top tray 30 extending across the width of belt 20 and lengthwise from the drive roller 22 to a predetermined drop point 32 positioned approximately three-quarters of the distance to the tension roller 24. The top side of the upper traverse 28 of the belt 20 is guided by suitable guide rail 34 along the edges of the belt 20 extending lengthwise above the tray 32. the lower traverse 36 of belt 20 is guided on the underside thereof by a bottom tray 38 extending across the width of the belt 20 from a position near the roller 26 lengthwise to a position near the driver roller 22. The traverse 36 of belt 20 is guided on the upper side thereof by suitable guide rails 40 near the upper surface of the belt 20 (clearance approximately three-eighths inch) extending lengthwise above the intermediate portion of the tray 38.

A hopper 42 is suitably mounted above the upper traverse 28 of the belt 20 over the driving roller 22 for supplying a gravity flow of comminuted breading 44 onto the webbing of the belt 20. Excluding the initial manual supply and replenishing of breading 44 into the hopper 42, recycled breading is returned to the hopper 42 by a suitable elevator 46, shown herein as a screw convyor 48, and chute 50 which has received excess breading from a suitable metering means 52 above the lower traverse 36 of belt 22. The metering means 52 shown herein involves an adjustable meter gate 54 and screw conveyor 56 (the details of which are not shown) for measuring and diverting excess breading to the elevator 46 as hereinafter described. The discharge of the hopper is manually regulated by a handle 58 to adjust a gate 60 adjacent a rotating meter roller 62.

An adjustable pressure roller 64 of stainless steel or of resilient material such as sponge rubber is located above the upper traverse 28 adjacent to the end of tray 30 near the drop point 32 in a manner to yieldingly ride on and/or exert a limited degree of pressure on the breaded food product 12 as it moves over the tray 30. Adjacent the drop point 32 at the end of tray 30 and above the upper traverse 28 of belt 22 is a suitable blower means 65 having a plurality of manifolds 66 and 67 for directing streams of air downward onto the belt 20 and anything riding thereon in a manner such that excess breading that has not fallen through the webbing of belt 20 as it passes the drop point 32 is blown off of the food product 12 and through the interstices or openings of belt 20.

Figure 2:
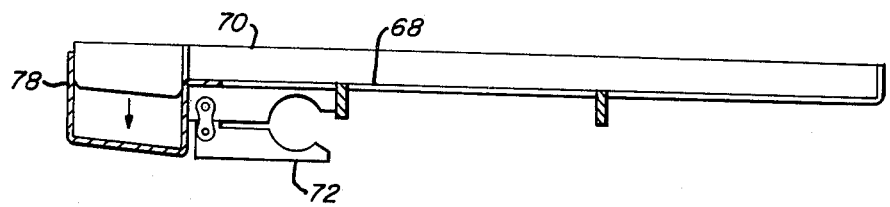
FIG. 2 is an enlarged elevational side view of the sifter.
Figure 3:
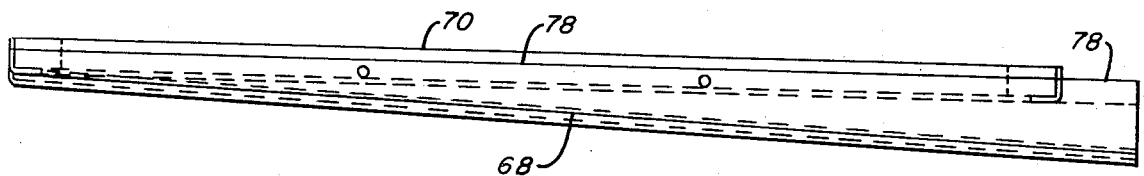
FIG. 3 is an enlarged elevational end view of the sifter.

Directly below the end of tray 30 on the area at the drop point 32 is a relatively large sifter screen 68 of suitable material such as wire cloth. The sifter screen 68 is mounted in a frame 70 with a mounting bracket 72 secured thereto on one end for receiving a rotating cam shaft 74. The opposite end of the frame 70 rides freely on a support shaft 76. Rotation of the cam shaft 74 which is suitably driven by a motor 77 (the driving linkage not shown) causes the frame 70 and the left hand edge of the sifter screen 68 to move in a circular path including vertical vibrations at the bracket 72 with the far edge of frame 70 riding on the support shaft 76. The frame 70 is constructed (FIGS. 2 and 3) and mounted in such a manner that the removable sifter screen is inclined to the left toward the receiving end of the machine as viewed in FIG. 1 thereby causing any breading lumps to roll off of the sifter screen 68 to a receiving chute 78 which is inclined to one side of the machine where such breading lumps are led off to a suitable disposal receptacle 80. The reusable comminuted breading which is free of moisture passes directly from the belt 20 at the drop point 32, through the screen to the top side of the lower traverse 36 of belt 20 where it is moved to the metering means 52 for separation thereof in a manner that a portion of said breading is returned to the hopper 42 and a metered portion is recirculated on the belt 20 to furnish a breading bed 82 on the top side of the upper traverse 28 of the belt 20. To assist in having the excess breading drop from the belt 20 at the drop point 32, shaker shaft 84 of square or other non-circular cross section suitably rotated by belting means from motor 77 is positioned adjacent the underside of the upper traverse 28 of the belt 20 in such a manner as to severely agitate said belt 20 at the drop point 32 whereby the excess breading is shaken loose from product 12 and is dropped and blown through the openings of the webbed belt 20 directly to the sifter screen 68.

OPERATION

In operation, the drive motor 18 is operated to cause the wire mesh belt to rotate clockwise as shown in FIG. 1 in an endless path around the drive roller 22 and tension rollers 24 and 26. Simultaneously, the motor 77 is operated to cause rotation of the shaker shaft 84 to vibrate the belt 20 through the area beyond the drop point 32 and below the blower manifolds 66 and 67. Operation of the motor 77 also causes rotation of the cam shaft 74 in the mounting bracket 72 to effect an unique rotational motion and vibrating of the sifter frame 70 and sifter screen 68 due to the fact that the eccentric motion of the cam shaft 74 is transmitted to the frame 70 by being directly rotatably attached thereto at the bracket 72. After suitable start-up procedures, such as running the machine without a food product 12 therein for a limited period of time to permit a layer or bed of comminuted breading 44 from the hopper 42 to be built up on the belt 20, the delivery belt 16 is put into operation by suitable means (not shown) to effect a delivery of moistened food products 12 to the machinery at pre-determined time and space intervals.

The food products 12 have been precoated with batter or oil or similar moistening material for providing adhesion thereto of the comminuted breading. As the moistened food product 12 is supplied to the machine 10, it is conveyed onto a bed or layer of the comminuted bread 44 riding on the top of the upper traverse 28 of belt 20 at a location above the drive roller 22. Riding on the breading 44 on belt 20 the breading adheres to the bottom of the food product 12 as it passes under a metered flow of comminuted breading 44 from the hopper 42 to completely cover the food product 12 in a manner that breading 44 is sticking to all outside surfaces thereof. The food product 12 now buried in breading 44 rides along the upper traverse 28 of the belt 20 above the top tray 30 for a brief distance and time interval to allow the breading to stick securely to the food product 12. As the food product 12 approaches the end of the top tray 30 near the drop point 32, it passes under a pressure roller 64 where it is subject to a light pressure, for further securing the breading to the food product 12. At the drop point 32, the portion of the belt 20 passing thereby is being vibrated by the rotating shaker shaft 84 such that, as the food product 12 passes over the end of the top tray 30, the excess breading 44 is vibrated off and immediately falls directly through the openings of the webbed belt 20 with an assist from the air stream from the manifolds 66 and 67. The food product 12 continues riding on the belt 20 to the tension nose roller 24 at which point it is conveyed onto a delivery belt 16 for delivery to any desired location such as a packaging means. The excess breading that was removed from the food product 12 on the vibrating belt at the drop point 32 and beneath the air manifolds 66 and 67, falls directly from the upper traverse 28 of the belt 20 through the openings thereof to a sifter screen 68 being moved in a circular vibrating motion. As the excess breading falls to the sifter screen 68, the loose breading passes directly therethrough onto the top side of the lower traverse 36 of the belt 20 riding on the bottom tray 38, while any breading lumps, formed by excess moisture taken from the surfaces of the food product 12, as well as scrap food particles are agitated in a manner to be rapidly bounced down the inclined slope of the sifter screen 68 to an inclined receiving chute 78 and thence to a suitable receptacle 80 for removal.

Due to location of the sifter screen 68 immediately under the drop point 32 it can be seen that the loose excess breading passes directly from the food product 12 through the openings of belt 20, through large sifter screen 68 to be recycled without engaging any conveyor, chute or transporting means which might possibly contaminate the recycled breading. The breading lumps and food particles are rapidly removed in a bouncing manner to limit contact with the sifter screen 68 and greatly reduce the possibility of contamination thereof.

The excess breading 44 falling from the sifter screen 68 is moved along the top side of the lower traverse 36 of the belt 20 (from right to left as viewed in FIG. 1) to the metering means 52 below the hopper 42, where the preset metering gate 54 determines how much of the recycling excess breading 44 will be passed on through the openings of the webbed belt 20 around the drive roller 22 to reform the bed of breading. The remainder of the breading 44 at the metering gate 54 is conveyed by the screw conveyor 56 to the screw conveyor 48 up the elevator 48 and thence via chute 50 to the hopper 42 for reuse in the breading operation with newly added breading as required.

Summarizing, the breading cycle is continuous with the individual food products 12 being completely engulfed with comminuted breading 44, compacted lightly by roller 64, and thereupon being vibrated and air blown to remove the excess breading which is immediately sifted and recycled while the food product 12 is conveyed on to other devices.

What is claimed is:

1. Breading apparatus comprising a plurality of rollers extending along a channel defining an upper path and a lower path, said upper path and said lower path being substantially parallel to each other, an endless mesh belt extending about said rollers through said upper path and said lower path, a first extremity portion of said belt in said upper path being adapted to receive solid units of food, hopper means for comminuted food particles communicating with said first extremity portion of said belt at said one end, a tray underlying said upper path and overlying said lower path throughout a span extending from said first extremity portion of said belt at said one end to a first intermediate portion of said belt, a pressure roller above said first path extending across said first intermediate portion of said belt with its axis perpendicular to the direction of travel of said belt, said pressure roller and said first intermediate portion of said belt in said upper path defining a pressure region through which said units of food and said comminuted food particles are advanced, a second intermediate portion of said belt in said upper path being disposed between said first intermediate portion of said belt and a second extremity portion of said belt at the other end of said channel, said second intermediate portion of said belt being adapted to transmit excess comminuted food particles therethrough, blower means for directing an air stream against said second intermediate portion of said belt in said upper path, agitation means for causing mechanical vibration of said second intermediate portion of said endless belt in said upper path sifting means underlying said second intermediate portion of said belt in said upper path and overlying said belt in said belt in said lower path in order to transmit excess comminuted food particles to an intermediate portion of said belt in said lower path for recycling and to retain agglomerates of such food particles for disposal, and elevator means at a first extremity portion of said belt in said lower path for returning said excess comminuted food particles from said belt in said lower path to said hopper means.

2. The breading apparatus of claim 1 wherein said sifting means vibrates.

3. The breading apparatus of claim 1 wherein said plurality of rollers include a roller of relatively large diameter at said first extremity portion, a roller of relatively small diameter at said second extremity portion, and a pair of rollers of intermediate diameter pinching said belt in said lower path at a position between said second extremity portion and said second intermediate portion.

4. The breading apparatus of claim 1 wherein said tray and said belt are in contiguity so that advancement of said belt advances comminuted food particles on said tray.

* * * * *